United States Patent
Hammer et al.

(10) Patent No.: US 7,036,844 B2
(45) Date of Patent: May 2, 2006

(54) BUMPER AIRBAG WITH MULTIPLE CHAMBERS

(75) Inventors: David R. Hammer, Glendale, AZ (US); Larry K. Hansen, Cave Creek, AZ (US); Deborah L. Kalisz, Phoenix, AZ (US); Paul G. Curry, Phoenix, AZ (US); Wesley Pack, Gilbert, AZ (US); Saeed David Barbat, Farmington Hills, MI (US); Priyaranjan Prasad, Plymouth, MI (US)

(73) Assignees: Ford Global Technologies, LLC, Dearborn, MI (US); Universal Propulsion Company, Inc., Phoenix, AZ (US)

( * ) Notice: Subject to any disclaimer, the term of this patent is extended or adjusted under 35 U.S.C. 154(b) by 372 days.

(21) Appl. No.: 10/250,603

(22) PCT Filed: Jan. 10, 2002

(86) PCT No.: PCT/US02/01034

§ 371 (c)(1),
(2), (4) Date: Jul. 1, 2003

(87) PCT Pub. No.: WO02/055337

PCT Pub. Date: Jul. 18, 2002

(65) Prior Publication Data

US 2004/0169362 A1      Sep. 2, 2004

Related U.S. Application Data

(60) Provisional application No. 60/261,056, filed on Jan. 11, 2001.

(51) Int. Cl.
*B60R 21/34*      (2006.01)
*B60R 19/20*      (2006.01)

(52) U.S. Cl. ................ 280/730.1; 280/729; 280/743.1; 293/107

(58) Field of Classification Search ................ 293/107; 280/729, 730.1, 743.1; 297/107; B60R 21/34
See application file for complete search history.

(56) References Cited

U.S. PATENT DOCUMENTS

| 3,656,791 A | 4/1972 | Truesdell |
| 3,708,194 A | 1/1973 | Amit |
| 3,822,076 A | 7/1974 | Mercier et al. |
| 4,176,858 A | 12/1979 | Kornhauser |
| 4,518,183 A | 5/1985 | Lee |
| 4,930,823 A | 6/1990 | Rivera |
| 5,106,137 A | 4/1992 | Curtis |
| 5,280,954 A * | 1/1994 | Henseler et al. ......... 280/743.1 |

(Continued)

FOREIGN PATENT DOCUMENTS

EP     1024063     8/2000

(Continued)

*Primary Examiner*—Eric Culbreth
(74) *Attorney, Agent, or Firm*—Frank A. MacKenzie; Jerry Holden

(57) ABSTRACT

A multi-chambered bumper airbag for deployment from the bumper of a vehicle in the event of a collision with another vehicle is provided. The airbag comprises a main inflatable portion that, when inflated, absorbs the energy from contact with a structural member of the struck vehicle. The airbag also has one or more secondary inflatable portions concentric with the main inflatable portion. Because the secondary inflatable portions have a lower gas pressure than the main inflatable portion, they are used to cushion the occupant of the struck vehicle should the occupants' head and neck be forced out of the window of the struck vehicle.

16 Claims, 6 Drawing Sheets

U.S. PATENT DOCUMENTS

| | | |
|---|---|---|
| 5,431,463 A | 7/1995 | Chou |
| 5,511,821 A * | 4/1996 | Meyer et al. ............ 280/743.1 |
| 5,646,613 A | 7/1997 | Cho |
| 5,651,569 A | 7/1997 | Molnar |
| 5,664,805 A * | 9/1997 | Yoshida et al. .......... 280/743.1 |
| 5,725,265 A | 3/1998 | Baber |
| 5,732,785 A | 3/1998 | Ran et al. |
| 5,833,265 A * | 11/1998 | Seymour ................. 280/743.1 |
| 6,056,336 A | 5/2000 | Balgobin |
| 6,126,214 A | 10/2000 | Kim |
| 6,149,193 A * | 11/2000 | Canterberry et al. ........ 280/741 |
| 6,450,556 B1 | 9/2002 | Jacobs |

FOREIGN PATENT DOCUMENTS

| | | |
|---|---|---|
| JP | 04298710 | 5/1994 |
| JP | 6144154 | 5/1994 |
| WO | 98/50254 | 11/1998 |

* cited by examiner

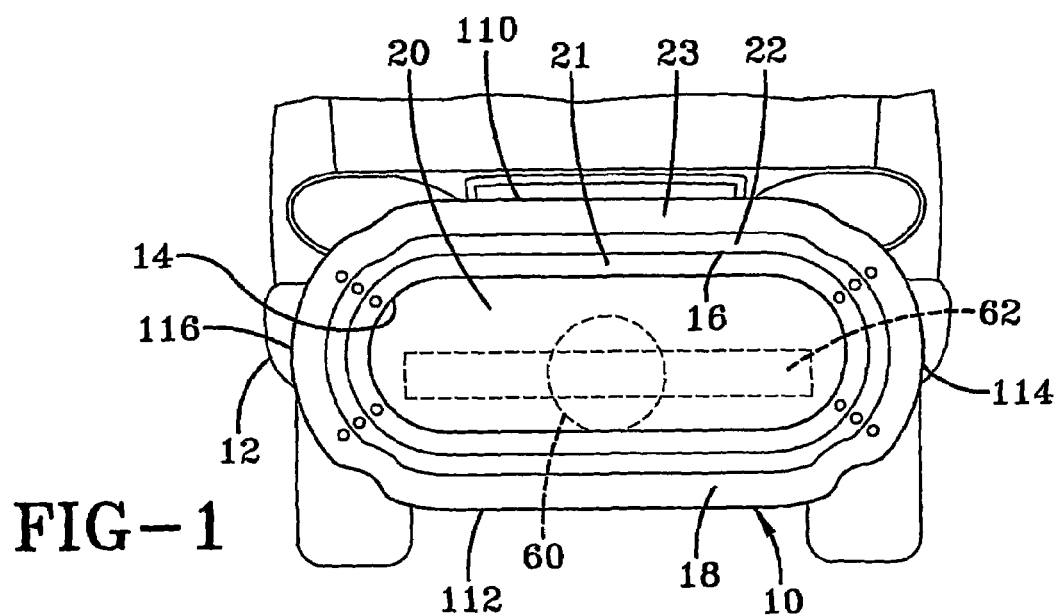
FIG-1
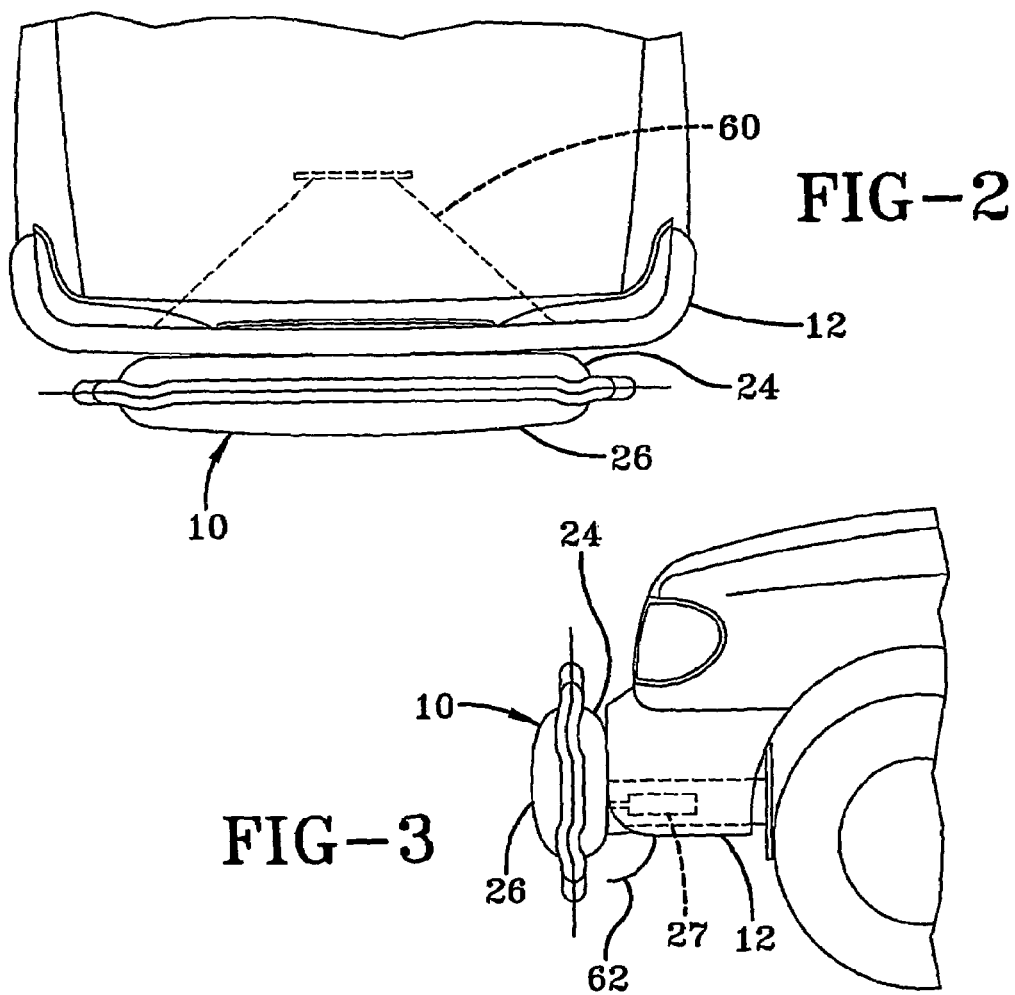
FIG-2
FIG-3

BUMPER AIRBAG WITH MULTIPLE CHAMBERS

CROSS REFERENCE TO RELATED APPLICATION

This application claims priority to Provisional Patent Application having Ser. No. 60/261,056, filed Jan. 11, 2001, which is incorporated herein by reference.

TECHNICAL FIELD

This invention relates generally to motor vehicle safety devices and in particular to a multi-chambered inflatable airbag for use in the bumper area of a motor vehicle.

BACKGROUND OF THE INVENTION

For years, the automotive industry has tried various methods and products to reduce the damage to passengers and vehicles in collisions. Of prime importance are the various systems of vehicle airbags that are deployed upon the sensing of an actual collision. These airbags are located in and about the passenger compartment of the motor vehicle and are inflated to surround and protect the occupants from serious injury.

Other methods of reducing, to some extent, the forces created in a collision from injuring the occupants are various attempts to provide "crush zones" at the front and the rear of the vehicle to absorb some of the collision forces. Still other methods also deal with design of the vehicle frame, engine mounts and other structural members to absorb the forces by means of controlled structural collapsing.

Another approach is externally mounted airbags that just prior to the instance of a crash, inflate and form a fluid-filled structure between the striking object or vehicle and the struck object or vehicle. PCT application number WO98/50254 "Collision Protection System for Vehicles" teaches airbags mounted to the front of a vehicle. U.S. Pat. No. 3,656,791 "Vehicle Impact-Cushioning Device" teaches an airbag mounted to deploy from the front end of a vehicle. U.S. Pat. No. 3,708,194 "Vehicle Safety Apparatus" teaches a front-end mounted airbag that includes a fire extinguishing material.

Several prior art patents deal with bumper improvements. U.S. Pat. No. 4,518,183 "extendible Safety Impact Bags for Vehicles" teaches mechanisms for extending bumpers outwardly of the vehicle upon the sensing of a potential crash. Air is supplied to airbags to form a somewhat rigid member supporting the bumpers for the duration of the crash and then the airbags are deflated and the bumpers return to their normal position. U.S. Pat. No. 4,930,823 "Vehicle Bumper" teaches front and rear bumpers having airbags that are inflated upon contact of the bumper with an object. U.S. Pat. No. 5,106,137 "Vehicle Bumper with Combination Foam and Airbag Energy Absorber" teaches a bumper having an internal cavity surrounded by compressible energy absorbing plastic. Inside the cavity is an airbag that is inflated upon the onset of a crash to provide more protection to the front or rear end of the vehicle.

U.S. Pat. No. 5,651,569 "datable Bumper System" teaches a bumper having an enclosed airbag that is permanently inflated to provide a permanent cushion bumper. U.S. Pat. No. 5,725,265 "Airbag System For Vehicle Bumpers" teaches an airbag concealed inside a bumper that is inflated and extends outwardly of the bumper to reduce the effects of the crash. The bumper has a breakaway panel on the outer surface of the bumper that is removed by the inflation of the airbag. U.S. Pat. No. 6,056,336 "Airbag with Internal Shock Absorber" teaches a bumper airbag having an internal shock absorber. The airbag is deployed in a circular shape. U.S. Pat. No. 6,126,214 "Air Bumper" teaches an air inflatable bumper that responds to a crash to provide an air-supported member to protect the car from damages due to collision.

Several prior art patents show a system for the detection of a crash and the deployment of airbags. U.S. Pat. No. 3,822,076 "Fluid Shock Absorbing Buffer," teaches a front or rear mounted airbag that are inflated when a telescopic rod extending from the vehicle touches a barrier. U.S. Pat. No. 4,176,858 "Energy Absorbing Bumper System" teaches a combination of a pneumatic bumper system supporting an airbag system that deploys in response to increased pressure in the pneumatic system as a result of an impact with an object.

U.S. Pat. No. 5,431,463 "Air Cell Bumper Device" teaches a plurality of air cells containing a plurality of small air cells grouped around a much larger air cell that stores inflation fluid. Upon impact, the material of cells is such that the larger cell ruptures and the fluid therein flows to the smaller cells buffering the impact. The invention is particularly useful on the sides of a vehicle. U.S. Pat. No. 5,646,613 "System for Minimizing Automobile Collision Damage" teaches the storage and deployment of various airbags around the vehicle as a result of proximity sensing. The different sides of the vehicle are uniquely controlled. U.S. Pat. No. 5,732,785 "Proactive Exterior Airbag System and Its Deployment Method for a Motor Vehicle" teaches a system having a detection unit, a control unit, and a deployment unit that together will deploy airbags mounted on the vehicle. This system deploys the airbags before the crash and describes the method used to determine distance and speed between the striking and struck vehicles or objects, European Patent Application EP 1,024,063 "Vehicle Bumper and Hood Airbag System" teaches a bumper and hood bag that is inflated prior to the collision of a pedestrian and the vehicle. The airbag is inflated to absorb the collision forces between the areas from the waist down of a pedestrian and the vehicle. JP 6,144,154 "Shock Relaxing Device" teaches an airbag deployed in front of a bumper to reduce the shock of a pedestrian or bike collision with a car.

The increased popularity of sports utility vehicles (SUVs), passenger trucks and other retail motor vehicles that stand higher than a standard motor vehicle, such as a sedan or sports car, has created new problems in the area of vehicle collisions. Specifically, when one of these higher standing vehicles broadsides a standard vehicle, because of the difference in height between the two vehicles, the bumper of the high vehicle will contact the side window portion of the struck vehicle instead of the door portion. If the collision happens at high speeds, the head of the occupant sitting adjacent the window portion may move outward past the window and into contact with the bumper of the higher vehicle.

Accordingly, there is a need for an airbag that can reduce the severity of such collisions.

SUMMARY OF THE INVENTION

An advantage of the present invention is that it reduces the energy transmitted when a higher standing vehicle collides with a standard vehicle.

Another advantage of the present invention is that it also reduces the energy transmitted to an occupant of the struck vehicle.

The present invention is a multi-chambered airbag for use in conjunction with the bumper of a motor vehicle. The airbag is comprised of a main chamber surrounded by one or more concentric secondary chambers. The secondary chambers are separated from adjacent chambers by frangible seams. Just prior to impact the main chamber is inflated to a first internal pressure, (i.e. the hard condition), so as to reduce the amount of momentum transferred to the struck vehicle. Upon contact, the internal pressure increases and the frangible seams sequentially burst allowing the secondary chambers to inflate. With the inflation of the secondary chambers, the pressure in the airbag decreases creating a soft condition making the secondary chambers soft enough to cushion any contact with the occupant of the struck vehicle. Because the airbag has a larger frontal area then a conventional bumper, it also reduces the momentum transfer by spreading it out over a larger area on the struck vehicle.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 1 is a front view of a portion of a vehicle having a bumper airbag as contemplated by the present invention.

FIG. 2 is a top view of the vehicle of FIG. 1.

FIG. 3 is a side view of the vehicle of FIG. 1.

DESCRIPTION OF THE PREFERRED EMBODIMENT

Figure 4:
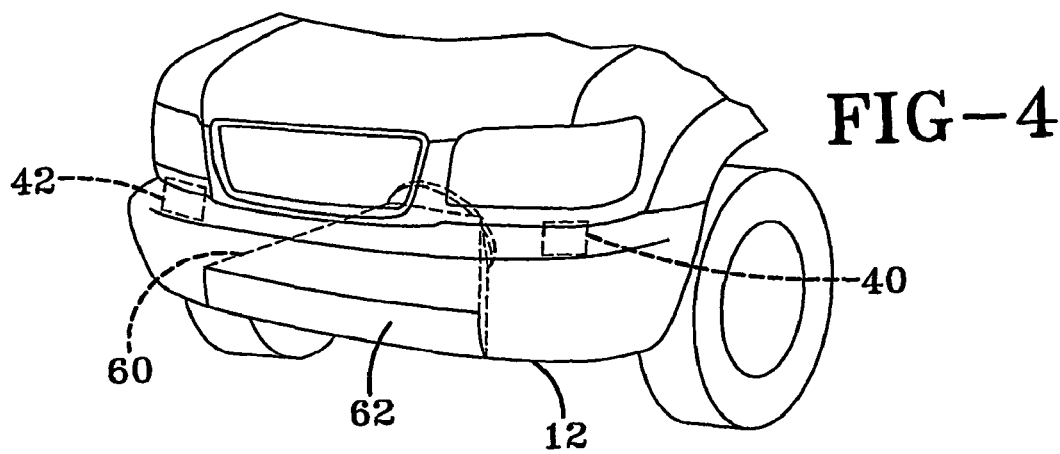
FIG. 4 is a perspective view of the vehicle of FIG. 1 showing a closed bumper airbag container.

Referring to FIGS. 1–3, a bumper airbag as contemplated by the present invention is generally denoted by reference numeral 10. In these FIGS., the bumper airbag 10 is shown in a partially inflated, deployed state. Though the bumper airbag 10 will be described herein as being mounted to a front bumper of a vehicle, as someone skilled in the art would appreciate, the bumper airbag 10 can also be mounted at other locations around a vehicle such as the vehicle's rear bumper.

Figure 7:
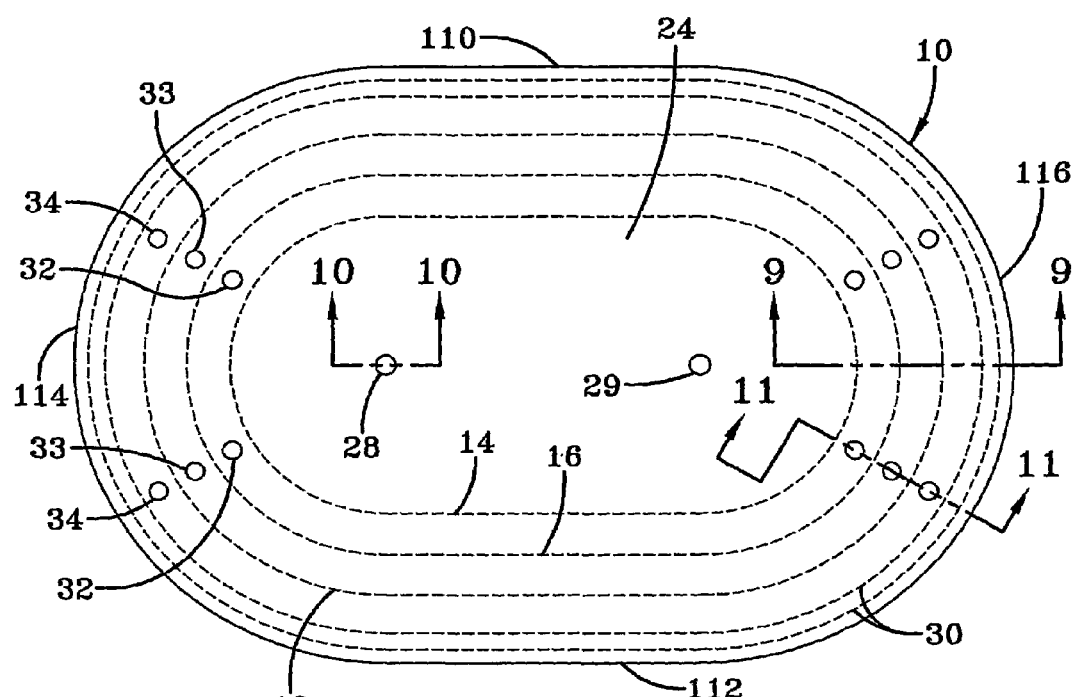
FIG. 7 is a plan view of the preferred embodiment of the bumper airbag contemplated by the present invention.
Figure 8:
FIG. 8 is a side view of the un-inflated bumper airbag of FIG. 7.
Figure 9:
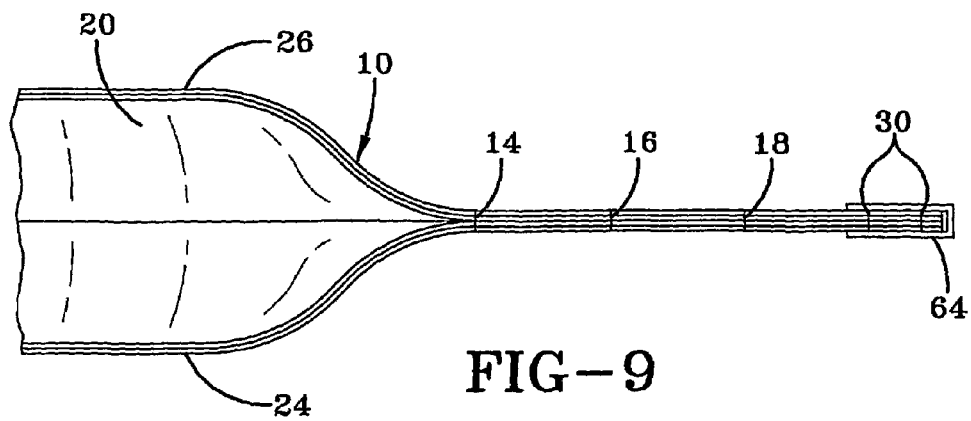
FIG. 9 is a partial cross-sectional view taken along line 9—9 in FIG. 7 with the center chamber of the bumper airbag partially inflated.

With continued reference to FIGS. 1–3 and reference to FIGS. 7–9, the bumper airbag 10 is formed from stitching together two pieces of fabric to define a rear fabric member 24 and a front fabric member 26. The stitching is sewn along the respective perimeter edges of the two pieces to form, when looking toward the front of the vehicle, atop edge 110, a bottom edge 112, a right edge 114 and a left edge 116. One or more, with two preferred, perimeter stitches 30 are used to couple the fabric members 24, 26. Alternatively, the bumper airbag 10 can be fabricated from a single piece of fabric and then folded over and stitched to define the rear and front members 24,26. The rear member 24 of the airbag 10 abuts against the vehicle when inflated and the front member 26 will contact the stricken vehicle, pedestrian or other object in a collision.

The first and second fabric members 24,26 are also connected along three frangible seams 14, 16, and 18 to define an inner or main chamber 20 and first, second and third chambers 21, 22, and 23 respectively. Each of the seams 14, 16 and 18 extends around the inner chamber 20 with seam 16 spaced radially outward from seam 14 and seam 18 spaced radially outward from seam 16 and radially inward from perimeter seams 30. Each of the seams 14,16, 18 is fabricated from a frangible nylon thread. The seams can be individual seams or can be a continuous seam wherein the first seam meets with the second seam by means of a threaded crossover. The seams 14,16,18 are substantially leak-proof, but have frangible threads that will, under the stress of increased pressure, rupture to open up the next chamber. The perimeter seams 30 do not have frangible threads. A folded over reinforcing tape 64 is applied over the entire outer edge of the airbag 10. The tape 64 in conjunction with the perimeter seams 30 acts to seal the airbag 10.

Figure 10:
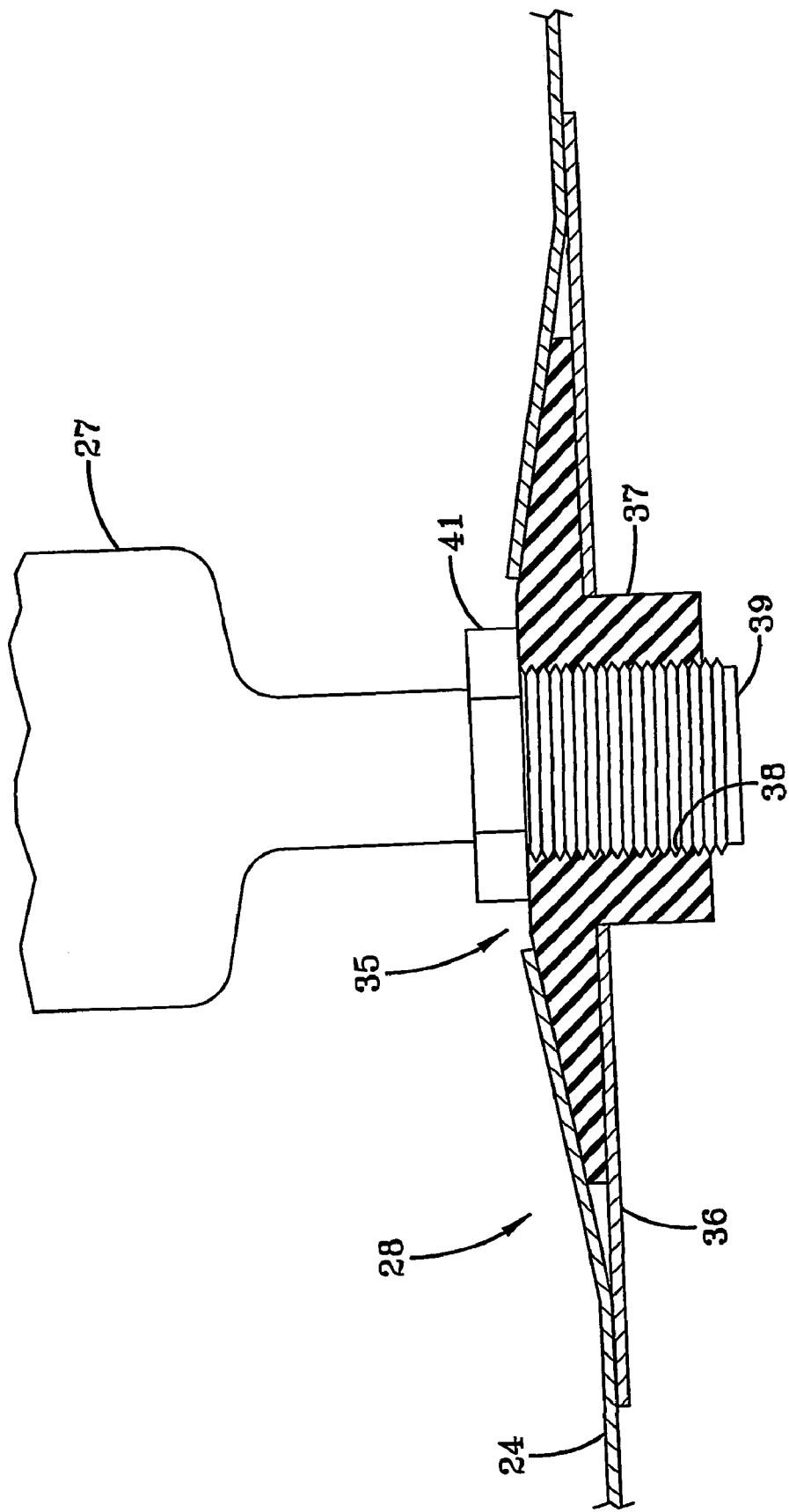
FIG. 10 is a cross-sectional view of the valve body taken along line 10—10 in FIG. 7.

Referring to FIGS. 7 and 10, a first valve assembly 28 is disposed in an aperture 35 through the rear fabric member 24 and places the interior of the airbag 10 in fluid communication with an inflator 27. The valve assembly 28 includes a reinforcing patch 36 that is applied to the inside of the rear fabric member 24. In the space between the member 24 and the reinforcing patch 36, a member 37 having a threaded hole 38 is positioned in line with the aperture 35. The threaded hole 38 is adapted to receive a corresponding threaded snout 39 that is connected to the inflator 27. A jam nut 41 secures the inflator snout to the fabric member 24. The reinforcing patch 36 is secured to the fabric member 24 by means of closely packed stitches made by a strong thread such as a nylon thread. To secure the member 37 an adhesive may be applied to the surfaces that are in contact with the fabric member 24 and/or the reinforcing patch 36. If two inflators are used, a second valve assembly 29, identical to valve assembly 28, may be disposed through the fabric member 24 at a location spaced from the first valve assembly for use with a second inflator.

Figure 5:
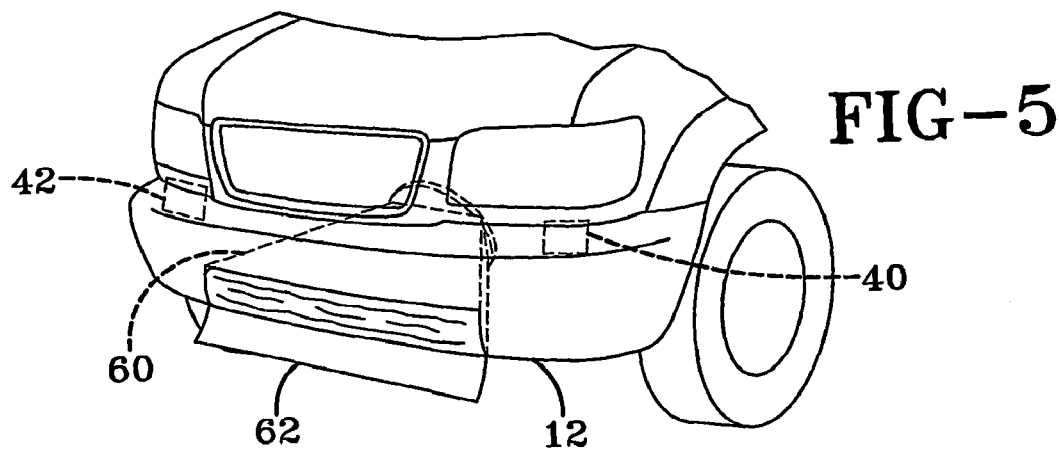
FIG. 5 is a perspective view of the vehicle of FIG. 1 showing a bumper airbag container with its door open.
Figure 6:
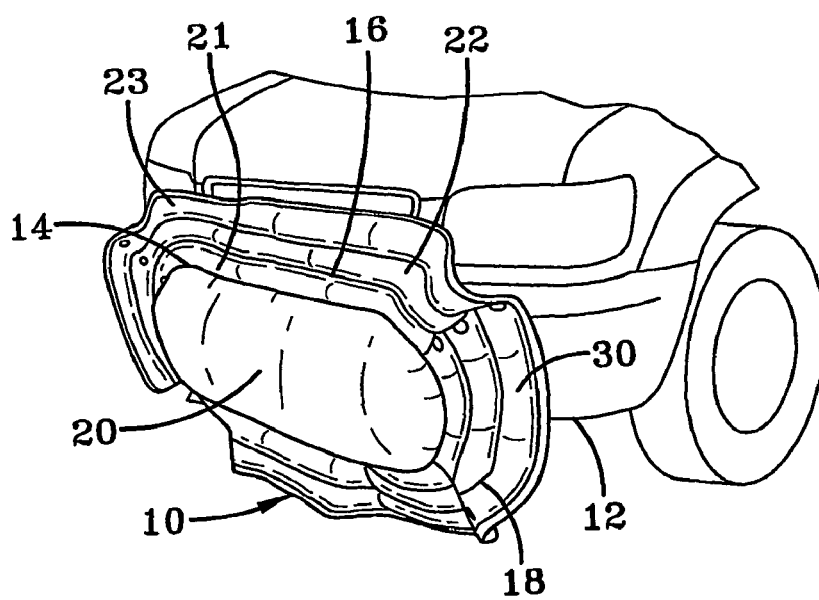
FIG. 6 is a perspective view of the vehicle of FIG. 1 showing a bumper airbag container with its door open and the airbag deployed.

Referring to FIGS. 4–6, the bumper airbag 10 is folded into an airbag container 60 with a door 62. The container 60 is mounted behind the bumper 12 and the door 62 is preferably part of the bumper. Sensors 40,42, which may be proximity sensors, are mounted on opposite sides of the vehicle and sense an imminent collision. Upon sensing a collision, the sensors 40, 42 send signals to a control unit 44, (see FIG. 12), which in turn signals the inflator 27 to ignite. Gas from the inflator passes through the valve assembly 28 and into the inner or main chamber 20 causing it to inflate and blow open door 62 about 10 milliseconds from when a firing signal is received at the inflator. The chamber 20, when inflated, forms the central portion of the airbag 10 and extends a substantial distance beyond the surface of the bumper and the chambers 21, 22, and 23 when inflated. The first chamber 20 makes contact with door and or window of the struck vehicle absorbing the energy of this contact. This impact causes an increase in pressure in the chamber 20. Once the pressure reaches a predetermined threshold, the frangible seam 14 ruptures causing the first chamber 21 to inflate. As chamber 21 inflates the gas volume decreases causing a drop of the gas pressure within the airbag 10. This process continues until all the remaining chambers 22 and 23 have been inflated or the collision as subsided. The pressures in the chambers 21–23 will be less than in the main chamber 20. Thus, the hard main chamber 20 absorbs the energy of the airbag-to-vehicle contact and the softer chambers 21–23 absorb the energy of the airbag-to-occupant contact. In one prototype of airbag 10, the main chamber 20 had a pressure in the range of 10–50 psig (i.e. hard) and the outermost chamber 23, when inflated had a pressure from 5–10 psig. Importantly, by sizing the different chambers 20–23 and selecting the strength of the frangible seams 14, 16, 18 one can customize the energy attenuation characteristic of the airbag 10 for different collision scenarios including the timing of events in the collision.

Figure 11:
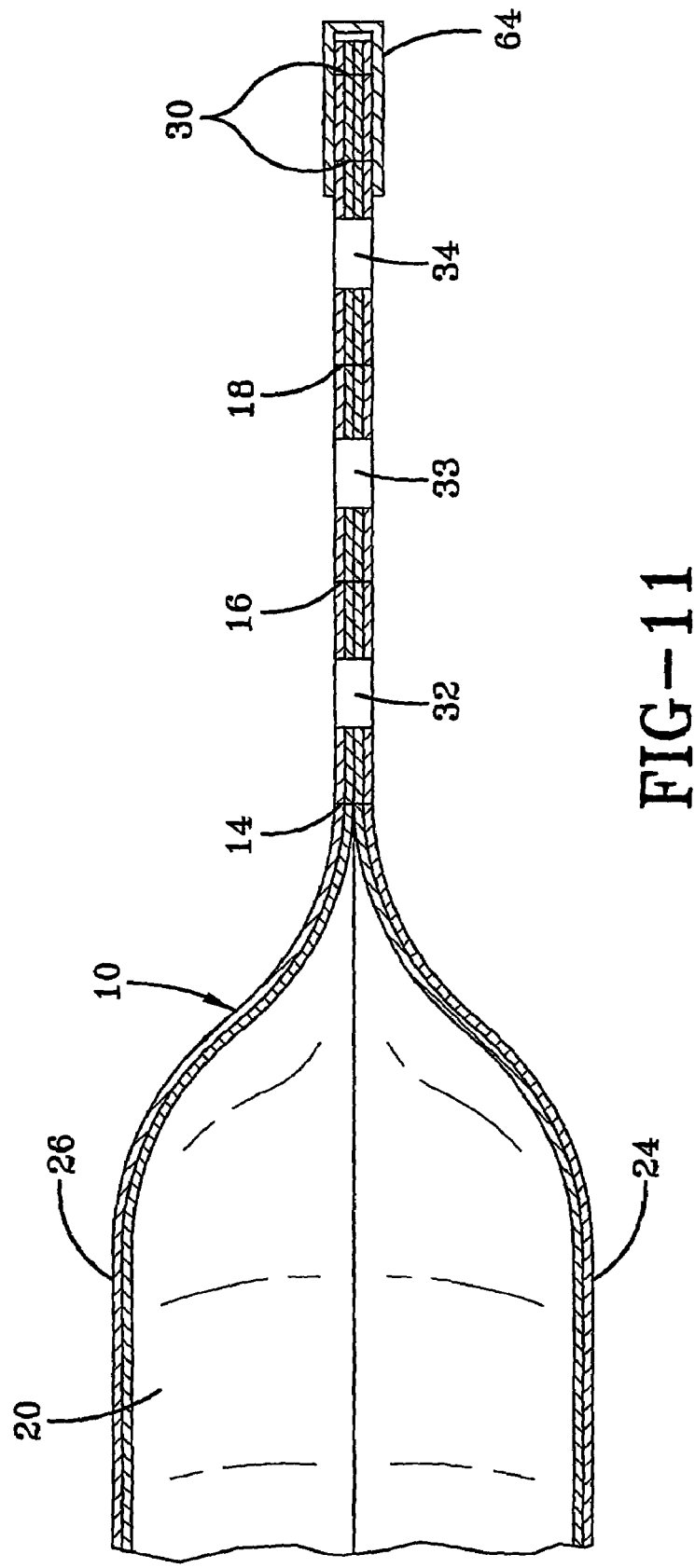
FIG. 11 is a partial cross-sectional view taken along line 11—11 in FIG. 7 with the central chamber of the bumper airbag partially inflated.

Further control of the energy attenuation characteristic can be obtained by using one or more vents 32, 33, 34 as shown in FIGS. 1,7, and 11. In the preferred embodiment, each of the chambers 21, 22, 23 has eight vents; four vents through fabric member 24 and four through fabric member 26. Each vent in fabric member 24 is aligned with a corresponding vent in fabric member 26. By using these vents one can control the timing of the deflation of the chambers 21,22,23. Further control can be accomplished by mounting valves, not shown, in the vents 32–34.

The fabric members 24,26 are preferably formed of two layers of a woven polyester and/or nylon non-porous material bonded together. The material may be silicone coated on either or both sides to ensure that the bags are nonporous. In some applications the members 24,26 may be comprised of a single layer of this nylon material. The outside surfaces of the fabric members 24,26 are stalwart puncture and abrasion resistant. Puncture resistance prevents contact with the stricken vehicle from tearing the material and abrasion resistance protects the occupants of the struck vehicle from being injured by the inflated airbag 10.

The inflator 27 is preferably a cold gas inflator. One reason for the cold gas inflator is that the inflation time of the gas in the airbag is longer than the typically hot gas inflator found in most airbags. Either cold gas or hot gas inflators may be used, but if more than one inflator is used, they both must be the same type.

Figure 12:
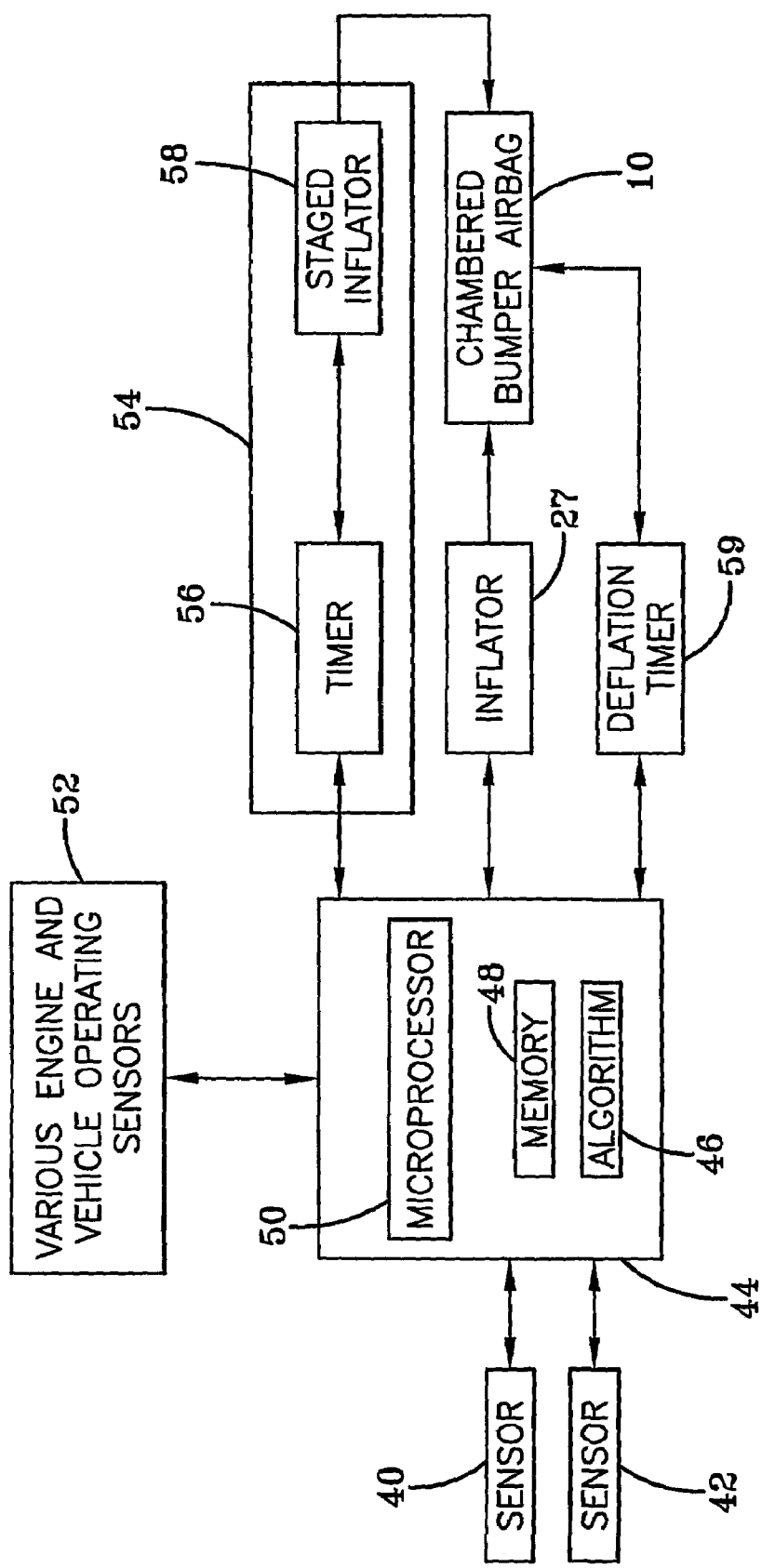
FIG. 12 is a block diagram control schematic of a control system for a bumper airbag as contemplated by the present invention.

Referring to FIG. 12, the control unit 44 includes a microprocessor 50 having both a memory section 48 and a deployment algorithm 46 stored therein. The algorithm 46 controls the processing of the sensed electrical signal generated from the sensor or sensors 40, 42. The microprocessor 50 may also receive one or more signals from other sensors on the vehicle that relate to the vehicle's operating condition. If the algorithm indicates an imminent collision, the microprocessor 50 sends a firing signal to the inflator 27. If a staged inflation system 54 is used, the firing signal is timed 56 and a second firing signal is generated and supplied to the two-stage inflator 58. Some systems may want a controlled deflation time to deflate the inflated chambered airbag, in which case another timer 59 is activated from a signal indicating activation to cause one or more vents in the airbag 10 to open.

A method for fabricating the bumper airbag 10 comprises the steps of obtaining first and second fabric members 24,26 and positioning the two fabric members so their respective perimeters are aligned. Alternatively, the second fabric member 26 can be formed by folding the first fabric member 24 back on itself. A first frangible seam 14 is then sewn radially inward of the perimeters to bind the two fabric members and to define the main chamber 20. A second frangible seam 16 is sewn radially outward of the first seam 14 to bind the fabric members 24, 26 together and to define a second chamber 21 concentric with the main chamber 20. In a like manner, a third frangible seam 18 radially outward from the second frangible seam 16 is added to define a third chamber 22 concentric with the second chamber 21. Finally, one or more non-frangible seams 30 are sewn adjacent the perimeters to define a fourth chamber 23 concentric with the third chamber 22 and for sealing the airbag 10. The frangible seams 14, 16, 18 are formed from either a continuous length of frangible thread for both seams and wherein at the conclusion of the first complete seam, the thread crosses the second chamber to begin the second seam. If more chambers are being fabricated, the continuous seam will continue across potential new chamber and the seam will continue until the seam is continuous and closed. In the alternative, each seam 14, 16, 18 may be the length of the frangible thread that completely closes on itself as the chamber 20–22 is defined. If separate lengths of frangible threads are used to enclose each successive chamber, the lengths of each seam will increase. Finally, a valve assembly 28 is inserted through one of the fabric members and connected to the inflator 27.

Various modifications and alterations to the above-described preferred embodiment will be apparent to those skilled in the art. Accordingly, this description of the invention should be considered exemplary and not as limiting the scope and spirit of the invention as set forth in the following claims.

What is claimed is:

1. A bumper airbag system for mounting on a motor vehicle comprising:
    a multi-chambered bumper airbag and;
    a source of inflation pressure adapted to inflate said airbag to a predetermined maximum inflation pressure;
    said multi-chambered bumper airbag comprising a first fabric member having a first perimeter, a second fabric member having a second perimeter, and a non-frangible seam connecting the first fabric member with the second fabric member near the first and second perimeters to define a chamber between the first and second fabric members;
    a first frangible seam connecting the first and second fabric members and located radially inward from the non-frangible seam to divide the chamber into a main chamber and a second chamber, said frangible seam having sufficient strength to withstand said maximum inflation pressure without rupturing; and
    at least one valve assembly disposed in the first fabric member for placing the main chamber in fluid communication with an inflating gas flow from said source of inflation pressure.

2. The airbag system of claim 1 wherein the main chamber is larger than the second chamber.

3. The airbag system of claim 2 further comprising a second frangible seam connecting the first and second fabric members and located radially between the first frangible seam and the non-frangible seam to split the second chamber into two chambers.

4. The airbag system of claim 2 further comprising a second and third frangible seam connecting the first and second fabric members and located radially between the first frangible seam and the non-frangible seam to split the second chamber into three chambers.

5. The airbag system of claim 1 further comprising at least one vent disposed in one of the fabric members for placing the second chamber in fluid communication with the ambient atmosphere around the airbag.

6. The airbag system of claim 1 wherein the first frangible seam is a continuous seam of frangible thread.

7. The airbag system of claim 1 wherein the outer surface of the second fabric member is puncture and abrasion resistant.

8. The airbag system of claim 7 wherein the outer surface of the first fabric member is puncture and abrasion resistant.

9. The airbag system of claim 1 wherein the first and second fabric members are fabricated from woven polyester non-porous material.

10. An inflatable multi-chambered bumper airbag system for a motor vehicle having a bumper comprising:
  a housing mounted inboard of the bumper and having a door flush with the outer surface of the bumper;
  a folded, non-inflated bumper airbag mounted in the housing behind the door, the airbag comprising a main chamber and a first outer chamber, said first outer chamber comprising a concentric chamber circumferentially disposed around said main chamber, said first outer chamber being separated from said main chamber by a seam of frangible thread;
  at least one sensor mounted on the vehicle for sensing an imminent collision with an object and generating a signal therefor;
  a control unit having a microprocessor having an algorithm stored therein for processing the signal from the sensor and generating a firing signal at a predetermined time before the collision occurs; and
  an inflator responsive to the firing signal and operatively connected to the main chamber for supplying sufficient inflation fluid to the main chamber to inflate said main chamber to a predetermined maximum inflation pressure, whereby the main chamber inflates, bursts through the door and forms an inflated cushion barrier extending at least partway across the vehicle;
  wherein said seam of frangible thread separating said main chamber from said first outer chamber comprises a seam of thread having sufficient strength to withstand said maximum inflation pressure without rupturing, said seam of thread adapted to rupture at a predetermined pressure above said maximum inflation pressure, such that upon impact between said main chamber and an object, said main chamber is overpressurized above said maximum inflation pressure causing said seam of frangible thread to rupture thereby inflating said first outer chamber.

11. The system of claim 10 further comprising:
  a plurality of concentric chambers disposed radially outward about said first outer chamber, each of said plurality of concentric chambers being separated from an adjacent chamber by a seam of thread adapted to rupture at a predetermined pressure.

12. The system of claim 11 further comprising a vent in one of said concentric chambers for controlling the rate at which the concentric chamber deflates.

13. The system of claim 10 wherein the predetermined time is less than one thousand milliseconds.

14. The system of claim 10 wherein the inflator is a cold gas inflator.

15. The system of claim 10 wherein the inflator is a staged cold gas inflator.

16. A method for fabricating a multi-chambered bumper airbag to be inflated to a maximum inflation pressure comprising the steps of:
  a) providing a first fabric member having a first perimeter;
  b) providing a second fabric member having a second perimeter;
  c) positioning the first and second fabric members so that the first and second perimeters align;
  d) sewing a first frangible seam inboard of the perimeters for binding the first and second fabric members together to define a main chamber circumscribed by the first frangible seam, said first frangible seam having sufficient strength to withstand said maximum inflation pressure without rupturing and adapted to rupture at a predetermined pressure above said maximum inflation pressure;
  e) sewing a second frangible seam radially outward from the first frangible seam for binding the first and second fabric members and to define a second chamber concentric with the main chamber;
  f) sewing a non-frangible seam adjacent the first and second perimeter for joining the first and second fabric members and forming a third chamber concentric with the second chamber; and
  g) mounting a gas inlet valve through the first fabric member.

* * * * *